US012736098B2

(12) United States Patent
Tan et al.

(10) Patent No.: US 12,736,098 B2
(45) Date of Patent: Sep. 15, 2026

(54) COMPOSITE BRAKE DISC, PREPARATION METHOD THEREOF AND FRICTION STIR TOOL

(71) Applicant: CRRC QISHUYAN INSTITUTE CO., LTD., Changzhou (CN)

(72) Inventors: Dong Tan, Changzhou (CN); Shaohua Xia, Changzhou (CN); Louming Li, Changzhou (CN); Shiqi Zhang, Changzhou (CN); Hongmei Gao, Changzhou (CN); Xiangping Li, Changzhou (CN); Jianyun Zhang, Changzhou (CN); Rong Lu, Changzhou (CN); Lu Chen, Changzhou (CN); Shanzhong Chen, Changzhou (CN)

(73) Assignee: CRRC QISHUYAN INSTITUTE CO., LTD., Changzhou (CN)

( * ) Notice: Subject to any disclaimer, the term of this patent is extended or adjusted under 35 U.S.C. 154(b) by 708 days.

(21) Appl. No.: 18/028,003

(22) PCT Filed: Sep. 20, 2021

(86) PCT No.: PCT/CN2021/119478

§ 371 (c)(1),
(2) Date: Mar. 23, 2023

(87) PCT Pub. No.: WO2022/063099

PCT Pub. Date: Mar. 31, 2022

(65) Prior Publication Data

US 2023/0349435 A1 Nov. 2, 2023

(30) Foreign Application Priority Data

Sep. 23, 2020 (CN) ......................... 202011009039.1
Sep. 23, 2020 (CN) ......................... 202011011458.9
(Continued)

(51) Int. Cl.
*F16D 65/12* (2006.01)
*B22D 1/00* (2006.01)
(Continued)

(52) U.S. Cl.
CPC ............. *F16D 65/125* (2013.01); *B22D 1/00* (2013.01); *B23K 20/122* (2013.01); *C22C 32/00* (2013.01); *F16D 2200/003* (2013.01)

(58) Field of Classification Search
CPC ........... F16D 65/12; F16D 65/123–127; F16D 2200/003; B22D 1/00; B23K 20/122; C22C 32/00
(Continued)

(56) References Cited

U.S. PATENT DOCUMENTS 6,131,707 A * 10/2000 Buechel .................. F16D 65/12 188/218 XL
12,358,071 B2 * 7/2025 Liang .................. C22C 32/0063
(Continued)

FOREIGN PATENT DOCUMENTS

CN 1298457 C 2/2007
CN 101560617 A 10/2009
(Continued)

OTHER PUBLICATIONS

IPIN Office Action for corresponding IN Application No. 202347028153; Mailed on May 31, 2023.
(Continued)

*Primary Examiner* — Christopher P Schwartz
(74) *Attorney, Agent, or Firm* — CANTOR COLBURN LLP

(57) ABSTRACT

The present application provides a composite brake disc, the preparation method thereof and a friction stir tool. The composite brake disc comprises: an aluminum alloy base
(Continued)

layer, and an aluminum matrix composite layer, where the aluminum alloy base layer and the aluminum matrix composite layer are bonded with each other through metallurgical bonding. A transition layer is formed at the boundary surface where the aluminum alloy base layer and the aluminum matrix composite layer are bonded with each other. A reinforced structure connecting the aluminum alloy base layer and the aluminum matrix composite layer is formed in the transition layer. The solutions according to the present application can increase the volume fraction of reinforcement particles in the aluminum matrix composite layer, thus increasing wear resistance, can avoid further addition of ceramic particles into the aluminum alloy base layer, thus increasing the strength and elongation of the aluminum alloy base layer, reducing the failure risk, and increasing the thermal conductivity of the aluminum alloy base layer, so that the heat generated by the friction layer is transferred to the air, thus reducing the overall temperature rise of the brake disc. In addition, the aluminum matrix composite layer in the solutions plays the role of a wear-resistant layer, and a transition layer is formed between the aluminum matrix composite layer and the aluminum alloy base layer through metallurgical bonding. The transition layer can prevent the volume fraction of ceramic particles between the aluminum matrix composite layer and the aluminum alloy base layer from changing instantly, thus reducing the stress difference between the aluminum matrix composite layer and the aluminum alloy base layer due to cold and hot fatigue, and increasing the bonding force between the aluminum matrix composite layer and the aluminum alloy base layer, so as to reduce the failure risk due to cracking between the aluminum matrix composite layer and the aluminum alloy base layer as a result of cold and hot fatigue and so on.

20 Claims, 6 Drawing Sheets

(30) Foreign Application Priority Data

Sep. 23, 2020 (CN) ........................ 202011011519.1
Sep. 23, 2020 (CN) ........................ 202011011691.7

(51) Int. Cl.
*B23K 20/12* (2006.01)
*C22C 32/00* (2006.01)

(58) Field of Classification Search
USPC .................................................. 188/218 XL
See application file for complete search history.

(56) References Cited

U.S. PATENT DOCUMENTS

2017/0175834 A1* 6/2017 Bracamonte ............. B22F 7/04
2017/0304933 A1* 10/2017 Miles .................. B23K 20/122

FOREIGN PATENT DOCUMENTS

CN 106499755 A 3/2017
CN 106499758 A 3/2017
CN 106812837 A 6/2017
CN 107088702 A 8/2017
CN 108003836 A 5/2018
CN 207569117 U * 7/2018 ............ F16D 69/02
CN 110205530 A * 9/2019 ............... B22F 5/00
CN 112143921 A 12/2020
CN 112157403 A 1/2021
CN 112413012 A 2/2021
DE 102012024497 A1 6/2014
IN 112091410 A 12/2020

OTHER PUBLICATIONS

CNIPA First Office Action for corresponding CN Application No. 202011009039.1; Mailing Date, May 18, 2021.
CNIPA First Office Action for corresponding CN Application No. 202011011458.9; Mailing Date, Aug. 17, 2021.
CNIPA First Office Action for corresponding CN Application No. 202011011519.1; Mailing Date, May 25, 2021.
CNIPA First Office Action for corresponding CN Application No. 202011011691.7; Mailing Date, Dec. 1, 2021.
CNIPA Rejection Decision for corresponding CN Application No. 202011011458.9; Mailing Date, Apr. 6, 2022.
CNIPA Rejection Decision for corresponding CN Application No. 202011011519.1; Mailing Date, Jul. 13, 2022.
CNIPA Second Office Action for corresponding CN Application No. 202011009039.1; Mailing Date, Oct. 18, 2021.
CNIPA Second Office Action for corresponding CN Application No. 202011011519.1; Mailing Date, Oct. 22, 2021.
CNIPA Second Office Action for corresponding CN Application No. 202011011691.7; Mailing Date, Aug. 3, 2022.
CNIPA Third Office Action for corresponding CN Application No. 202011011519.1; Mailing Date, Mar. 14, 2022.
CNIPA Third Office Action for corresponding CN Application No. 202011011691.7; Mailing Date, Jan. 31, 2023.
CNIPA Second Office Action for corresponding CN Application No. 202011011458.9; Mailing Date, Jan. 6, 2022.
International Search Report for International Application No. PCT/CN2021/119478; Mailing Date, Nov. 30, 2021.
Zhang et al., "A Study of Design and Manufacturing Process of WC-Re Composite Friction Stir Welding Tool", Manufacturing Technology & Machine Tool, No. 6, Jun. 30, 2019, pp. 97-101; with English abstract only.
IP IN Hearing Notice for corresponding IN Application No. 202347028153; date of Dispatch Jun. 27, 2024; 3 pages.
Li, Yalin, et al., "Research Progress on Friction and Wear Behavior of Aluminum Matrix Composites for Automobile Brake Discs", Material Reports, vol. 34, pp. 361-361, May 2020; published May 31, 2020; 13 pages.
SIPA Office Action for corresponding CN Application No. 202180065279.X; Issued Apr. 1, 2025.
Song, Xuecheng, et al., "Microstructure and Mechanical Properties of Dissimilar FS Wed Joint of SiCp/Al Composites to 2024 Aluminum Alloy", Aerospace Equipment Manufacturing Technology, Issue 1/2, 2016, pp. 139-142, Jan. 2016, Shanghai 20245 CHN, published Jan. 31, 2016; 8 pages.
Yun, Sun, et al., "Stress Analysis and Structure Design of Stirring Head Based on ABAQUS", China Heavy Equipment, Issue 2, pp. 18-22, Feb. 2016, published Feb. 29, 2016; 11 pages.
Zhang, Jia-bo, et al., "A Study of Design and Manufacturing Process of WC-Re Composite Stirring Head", Manufacturing Technology and Machine Tools, Issue 6, pp. 97-101, Jun. 2019; published Jun. 30, 2019; 11 pages.

* cited by examiner

COMPOSITE BRAKE DISC, PREPARATION METHOD THEREOF AND FRICTION STIR TOOL

CROSS REFERENCE TO RELATED APPLICATIONS

This is the U.S. national stage of application No. PCT/CN2021/119478, filed on Sep. 20, 2021. Priority under 35 U.S.C. § 119(a) and 35 U.S.C. § 365(b) is claimed from: Chinese Application No. 202011011519.1, filed Sep. 23, 2020; Chinese Application No. 202011009039.1; filed Sep. 23, 2020, Chinese Application No. 202011011691.7; filed Sep. 23, 2020; and, Chinese Application No. 202011011458.9, filed Sep. 23, 2020. The disclosures all of which are also incorporated herein by reference.

FIELD OF THE INVENTION

The present application relates to the field of brake discs, in particular to a composite brake disc, a preparation method for preparing an aluminum matrix composite brake disc and a friction stir tool for friction stir processing of aluminum matrix composites to be welded.

BACKGROUND OF THE INVENTION

With the increasing pressure of environmental protection, energy conservation, emission reduction and environmental pollution reduction have become a basic state policy. Reducing the weight of rail transit vehicles and reducing the energy consumption and emissions caused by frequent starting and braking is one of the most effective ways to achieve energy conservation and emission reduction goals. At present, one of the main ways to reduce the weight of rail transit vehicles is to replace the traditional steel and iron brake discs with new lightweight material brake discs, so as to reduce the weight of the unsprung parts and components of the running vehicles and maintain an ideal sprung-to-unsprung weight ratio. At present, lightweight material brake discs mainly include carbon/carbon fiber composite, ceramic composite and aluminum matrix composite brake discs. Among them, the research on ceramic particle reinforced aluminum matrix composite brake discs is relatively extensive.

Among them, the existing aluminum matrix composite brake discs are mainly ceramic particle reinforced aluminum matrix composite brake discs, such as SiC particle reinforced aluminum matrix composite brake discs. The entire brake disc is made of the same material, and is mainly prepared by the vacuum stirring casting method. The aluminum matrix composite brake disc prepared using this method and the method itself have the following technical problems.

First of all, increasing the amount of ceramic particles added can improve the wear resistance of the aluminum matrix composite brake disc, but it will reduce the tenacity and affect its comprehensive mechanical properties, and at the same time affect the formability of the aluminum matrix composites and cause defects such as insufficient pouring, pores or slag inclusion. In view of the above reasons, in the prior art, the amount of ceramic particles added into the ceramic particle reinforced aluminum matrix composite brake disc prepared using the vacuum stirring casting method is about 20%, which is difficult to meet the requirements of wear resistance.

Secondly, the vacuum stirring casting equipment has high requirements for process control. The brake disc made of ceramic particle reinforced aluminum matrix composites thus prepared is prone to have defects such as pores, slag inclusion and ceramic particle segregation.

Thirdly, when preparing aluminum matrix composites using the vacuum stirring casting method, it requires a relatively large investment due to the use of expensive vacuum stirring manufacturing equipment.

Under these circumstances, on the one hand, in order to overcome the defects of the integral-type aluminum matrix composite brake disc, currently, a new trend of brake disc development is to use aluminum alloy to fabricate the base. At the same time, in order to improve wear resistance and high-temperature resistance, a wear-resistant layer is arranged on the aluminum alloy base. The wear-resistant layer is made of a material different from that of the aluminum alloy base layer. For example, the Chinese patent with publication number of CN204852099U discloses an automobile brake disc. The brake disc body is made of aluminum alloy, and the working surface of the brake disc body is covered with a wear-resistant layer to improve the wear-resistance of the brake disc. However, due to the limited thermal insulation performance of the wear-resistant layer, frequent braking makes the temperature of the wear-resistant layer rise sharply, resulting in the expansion of the aluminum alloy base. The mismatch between the thermal expansion coefficient of the wear-resistant layer and that of the aluminum alloy base will affect the bonding strength between the two, which makes it easy for the wear-resistant layer to fall off, thus affecting the running safety of the train.

On the other hand, with regard to the vacuum stirring casting method used to prepare aluminum matrix composites, in the prior art, the patent CN1298457C discloses a vacuum mechanical dual-stirring casting method, the method comprising: melting, purifying, cooling and deslagging aluminum; performing a reverse slow-speed internal stirring under vacuum condition to complete a degassing process; adding pretreated reinforcement particles onto the surface of the molten aluminum after slag removal; mixing the reinforcement particles into the melt by performing forward internal and external stirrings simultaneously; stopping the external stirring, and performing a high-speed internal stirring to enable the reinforcement particles to be uniformly distributed in the liquid while retaining a stable liquid surface; heating, and then performing a reverse internal and external dual-stirring with slow rotation to complete the degassing process; adding modifier and refiner, and performing an internal stirring with slow rotation to enable them to be mixed into the melt and uniformly distributed; removing vacuum, discharging from the furnace, and casting to obtain ingots.

However, the size of reinforcement particles is not sieved in this method, so the size of reinforcement particles is largely random. The aluminum matrix composites thus prepared is not suitable for the processing of brake discs. This is because it is required that the wear resistance and braking performance of the brake discs of the whole vehicle tend to be consistent. If the aluminum matrix composites prepared according to the above method is used for the brake disc, the performance of the brake disc is not stable enough.

Furthermore, the Friction Stir Welding (FSW) involved in the preparation of such products is a new solid phase joining technology. The working principle of welding is that the high-speed rotating stirring head moves along the welding direction after penetrating into the workpiece, generating friction heat at the contact portion between the stirring head and the workpiece, and thus making the surrounding metal form a plasticity softening layer, so that the softened metal fills the rear cavity with the rotation of the stirring head and realizes material connection under the stirring and extrusion action of the shaft shoulder and the stirring needle.

However, at present, the friction stir tools commonly used in friction stir welding of particle reinforced aluminum matrix composites are mainly integral-type friction stir tools, where the stirring head and the clamping body connecting the stirring head and the equipment are both made of expensive cemented carbide. In friction welding fields of other material, in order to reduce the use of cemented carbide so as to reduce cost, there are combined-type friction stir tools, but the combined-type friction stir tools currently available on the market have the problem that the axis of the main part of the stirring head is not coaxial with the axis of the clamping body. This will lead to the "eccentricity" of the stirring head when it is working, which not only affects the quality, but also causes fracture of the stirring head due to uneven stress.

SUMMARY OF THE INVENTION

In order to effectively solve or at least alleviate some problems or deficiencies in the existing composite brake discs and the preparation process, one of the main objectives of the present invention is to provide a composite brake disc, which can not only overcome the deficiency of the integral-type aluminum matrix composite brake disc, but also solve the problem of poor bonding force between the base and the wear-resistant layer. Another main objective of the present invention is to provide a method for preparing an aluminum matrix composite brake disc. Yet another main objective of the present invention is to provide a friction stir tool for friction stir processing of aluminum matrix composites to be welded, so as to solve the problem that the integral-type friction stir tool is expensive, or the axis of the stirring head is not coaxial with the axis of the clamping body in the combined-type friction stir tool According to one aspect of the present application, a composite brake disc is provided, which comprises an aluminum alloy base layer and an aluminum matrix composite layer. The aluminum alloy base layer and the aluminum matrix composite layer are bonded with each other through metallurgical bonding, and a transition layer is formed at the boundary surface where the aluminum alloy base layer and the aluminum matrix composite layer are bonded with each other. In the transition layer, a reinforced structure connecting the aluminum alloy base layer and the aluminum matrix composite layer is formed.

According to another aspect of the present application, a composite brake disc is provided, which comprises an aluminum alloy base layer and an aluminum matrix composite layer. The aluminum alloy base layer and the aluminum matrix composite layer are bonded with each other through metallurgical bonding, and a transition layer is formed at the boundary surface where the aluminum alloy base layer and the aluminum matrix composite layer are bonded with each other. The transition layer has a reconstructed metallographic structure, where the metallographic structure of the transition layer is different from that of the aluminum alloy base layer and that of the aluminum matrix composite layer, so that a bonding force is created between the aluminum alloy base layer and the aluminum matrix composite layer.

In a composite brake disc according to another embodiment or any of the above embodiments of the present application, the reinforced structure is a structure that allows the aluminum alloy base layer and the aluminum matrix composite layer to enter each other.

In a composite brake disc according to another embodiment or any of the above embodiments of the present application, the transition layer has a spherical or spheroidal silicon phase.

In a composite brake disc according to another embodiment or any of the above embodiments of the present application, the length of silicon phase is ≤10 μm, and the sphericity of silicon phase is 20%-100%.

In a composite brake disc according to another embodiment or any of the above embodiments of the present application, the reinforced structure forms the composition transition between the aluminum alloy base layer and the aluminum matrix composite layer.

In a composite brake disc according to another embodiment or any of the above embodiments of the present application, the transition layer comprises a near-aluminum matrix composite layer part on the side of the aluminum matrix composite layer and a near-aluminum alloy base layer part on the side of the aluminum alloy base layer.

In a composite brake disc according to another embodiment or any of the above embodiments of the present application, the aluminum matrix composite layer and the near-aluminum matrix composite layer part both have reinforcement particles, where the percentage of reinforcement particles decreases in gradient from the aluminum matrix composite layer to the near-aluminum matrix composite layer part.

In a composite brake disc according to another embodiment or any of the above embodiments of the present application, the aluminum alloy base layer and the near-aluminum alloy base layer both have reinforcement particles, where the percentage of reinforcement particles increases in gradient from the aluminum alloy base layer to the near-aluminum alloy base layer part.

In a composite brake disc according to another embodiment or any of the above embodiments of the present application, the metallurgical bonding method is friction stir processing.

In a composite brake disc according to another embodiment or any of the above embodiments of the present application, for the aluminum alloy base layer, the tensile strength Rm is ≥200 MPa, the elongation after fracture A is ≥2%, and the hardness is ≥90 HBW.

Further, for the aluminum matrix composite layer, the tensile strength Rm is ≥140 MPa, the elongation after fracture A is ≥0.5% and the hardness is ≥65 HBW.

In a composite brake disc according to another embodiment or any of the above embodiments of the present application, the elongation after fracture of the transition layer A is ≥1%.

In a composite brake disc according to another embodiment or any of the above embodiments of the present application, the micro-grain size of the transition layer is smaller than that of the aluminum alloy base layer and that of the aluminum matrix composite layer.

In a composite brake disc according to another embodiment or any of the above embodiments of the present application, the reinforcement particles are ceramic particles.

In a composite brake disc according to another embodiment or any of the above embodiments of the present application, the ceramic particles are any one or combination of SiC, TiN or BN.

In a composite brake disc according to another embodiment or any of the above embodiments of the present application, the volume fraction of ceramic particles is 15% to 30%.

In a composite brake disc according to another embodiment or any of the above embodiments of the present application, the volume fraction of ceramic particles is 20% to 30%.

In a composite brake disc according to another embodiment or any of the above embodiments of the present application, the size of ceramic particles is 10-40 μm, and the normal distribution value thereof is 10-30 μm.

In a composite brake disc according to another embodiment or any of the above embodiments of the present application, the aluminum matrix composite layer is prepared by casting, powder metallurgy, or spray deposition process.

According to yet another aspect of the present application, a preparation method for preparing an aluminum matrix composite brake disc is also provided. The preparation method comprises the following steps: blank formation step S1: forming an aluminum alloy base layer using aluminum; aluminum matrix composite layer formation step S2: forming an aluminum matrix composite layer using aluminum matrix composites; laminating step S3: laminating the aluminum matrix composite layer and the aluminum alloy base layer to form a composite structure; friction stir processing step S6: friction stir processing the surface of the composite structure, forming a transition layer between the aluminum matrix composite layer and the aluminum alloy base layer, and bonding the aluminum matrix composite layer and the aluminum alloy base layer together.

In a preparation method according to another embodiment or any of the above embodiments of the present application, in the friction stir processing step S6, the original dendrites in the aluminum alloy base layer and the aluminum matrix composite layer are broken to obtain fine grains of the aluminum alloy base layer and the aluminum matrix composite layer.

In a preparation method according to another embodiment or any of the above embodiments of the present application, in the aluminum matrix composite layer formation step S2, an aluminum matrix composite layer with a plurality of through-holes is prepared by direct drilling method.

In a preparation method according to another embodiment or any of the above embodiments of the present application, in the aluminum matrix composite layer formation step S2, a plurality of through-holes in array form are formed in the aluminum matrix composite layer.

In a preparation method according to another embodiment or any of the above embodiments of the present application, the aluminum matrix composite layer formation step S2 comprises: an aluminum base circular plate formation step S21: forming a circular aluminum matrix composite layer using aluminum matrix composites; through-hole formation step S22: opening a plurality of through-holes on the aluminum base circular plate.

In a preparation method according to another embodiment or any of the above embodiments of the present application, after the laminating step S3, an additive adding step S4 of adding reinforcement particles to the plurality of through holes is also included.

In a preparation method according to another embodiment or any of the above embodiments of the present application, after the additive adding step S4, an aluminum plate covering step S5 of arranging an aluminum plate on the aluminum matrix composite layer for covering the reinforcement particles is also included.

In a preparation method according to another embodiment or any of the above embodiments of the present application, in the additive adding step S4, the reinforcement particles are ceramic particles.

In a preparation method according to another embodiment or any of the above embodiments of the present application, the ceramic particles are one or more of SiC, TiN and BN.

In a preparation method according to another embodiment or any of the above embodiments of the present application, the friction stir processing step S6 comprises a mixing step S61 and a cooling step S62. In the mixing step S61, the aluminum alloy base layer and the aluminum matrix composite layer are mixed together at the contact portion; and in the cooling step S62, a brake disc with a transition layer is formed, where the transition layer is formed from the mixed part.

According to still another aspect of the present application, a preparation method for preparing an aluminum matrix composite brake disc is further provided, which comprises the following steps: aluminum melting step S2: melting aluminum completely to form molten aluminum; melt formation step S3: adding alloying materials into the molten aluminum to form a melt; mechanical stirring step S4: mechanically stirring the melt; reinforcement particle adding step S5: adding reinforcement particles into the melt and accelerating mechanical stirring; rolling step S6: rolling the melt into aluminum matrix composite layer under vacuum condition; friction stir processing step S7: friction stir processing the aluminum matrix composite layer and a pre-prepared aluminum alloy base layer, and bonding the aluminum matrix composite layer and the aluminum alloy base layer together.

In a preparation method according to another embodiment or any of the above embodiments of the present application, before the reinforcement particle adding step S5, a reinforcement particle sieving step Z1 of sieving reinforcement particles is included.

In a preparation method according to another embodiment or any of the above embodiments of the present application, in the reinforcement particle sieving step Z1, reinforcement particles with particle size of 10-40 μm and normal distribution value of 10-30 μm are screened out.

In a preparation method according to another embodiment or any of the above embodiments of the present application, the reinforcement particles are SiC particles.

In a preparation method according to another embodiment or any of the above embodiments of the present application, between the reinforcement particle adding step S5 and the reinforcement particle sieving step Z1, a reinforcement particle roasting pretreatment step Z2 of performing a roasting pretreatment on the reinforcement particles to remove surface impurities and moisture is included.

In a preparation method according to another embodiment or any of the above embodiments of the present application, the reinforcement particle roasting pretreatment step Z2 comprises forming a SiO2 oxidation film on the surface of the SiC particles that are served as the reinforcement particles.

In a preparation method according to another embodiment or any of the above embodiments of the present application, in the reinforcement particle adding step S5, the reinforcement particles are added at a speed of 2-5 g/s.

In a preparation method according to another embodiment or any of the above embodiments of the present application, before the melt formation step S3, a modifier and refiner weighing step X1 of weighing the modifier and refiner based on the weight ratio of aluminum is included.

In a preparation method according to another embodiment or any of the above embodiments of the present application, between the melt formation step S3 and the modifier and refiner weighing step X1, a step X3 of adding modifier and refiner into the molten aluminum to form a melt is included.

In a preparation method according to another embodiment or any of the above embodiments of the present application, between the modifier and refiner weighing step X1 and the step X3 of adding the modifier and refiner into the molten aluminum, a baking step X2 of baking the modifier and refiner to remove moisture is included.

In a preparation method according to another embodiment or any of the above embodiments of the present application, before the aluminum melting step S2, an aluminum preparation step S1 of baking the aluminum to remove moisture is included.

In a preparation method according to another embodiment or any of the above embodiments of the present application, the friction stir processing step S6 comprises a mixing step S61 and a cooling step S62. In the mixing step S61, the aluminum alloy base layer and the aluminum matrix composite layer are fully mixed together at the contact portion; in the cooling step S62, a brake disc with a transition layer is formed.

In a preparation method according to another embodiment or any of the above embodiments of the present application, in the friction stir processing step S6, the stirring speed of friction stir processing is 600-1200 rpm, and the feed speed is 100-500 mm/min.

In a preparation method according to another embodiment or any of the above embodiments of the present application, in the reinforcement particle roasting pretreatment step S3, the roasting pretreatment temperature is at 400-1000° C.

In a preparation method according to another embodiment or any of the above embodiments of the present application, in the mechanical stirring step S4, the rotational speed of the motor is controlled at 500-600 rpm.

In a preparation method according to another embodiment or any of the above embodiments of the present application, in friction stir processing step S6, a transition layer is formed between the aluminum matrix composite layer and the aluminum alloy base layer.

In a preparation method according to another embodiment or any of the above embodiments of the present application, for the aluminum matrix composite layer, the tensile strength Rm is ≥140 MPa, the elongation after fracture A is ≥0.5%, and the hardness is ≥65 HBW.

In a preparation method according to another embodiment or any of the above embodiments of the present application, the transition layer has a spherical or spheroidal silicon phase.

In a preparation method according to another embodiment or any of the above embodiments of the present application, the silicon phase length is ≤10 μm, and the sphericity of the silicon phase is 20%-100%.

According to a further aspect of the present application, a friction stir tool for friction stir processing of aluminum matrix composites to be welded is further provided. The friction stir tool comprises a stirring head and a clamping body. The stirring head has a first conical surface, the clamping body has a second conical surface, and the first conical surface and the second conical surface are in contact with each other, so that the stirring head is coaxially installed in the clamping body. The friction stir tool also has a fixing structure for fixing the stirring head and the clamping body together.

In a friction stir tool according to another embodiment or any of the above embodiments of the present application, the stirring head is installed in the clamping body, so that the position of the stirring head will not change when a radial force is applied, and the stirring head and the clamping body are firmly fixed when an axial force is applied during operation.

In a friction stir tool according to another embodiment or any of the above embodiments of the present application, the included angle α between the first conical surface and the axis of the stirring head is greater than 0° and less than 45°.

In a friction stir tool according to another embodiment or any of the above embodiments of the present application, the relational expression between the length L of the first conical surface and the radius D of shaft shoulder of the stirring head is: L=(0.5~1)×D×sin α.

In a friction stir tool according to another embodiment or any of the above embodiments of the present application, the bottom of the clamping body has at least one threaded hole perpendicular to the axis of the clamping body, and the stirring head has a conical bore corresponding to the installation position of the threaded hole, where a set screw is installed in the threaded hole, and the top of the set screw is positioned in the conical bore.

In a friction stir tool according to another embodiment or any of the above embodiments of the present application, the bottom of the stirring head is provided with a stirring needle with a radius d that is less than the radius D of shaft shoulder of the stirring head, where the height h of the stirring needle is slightly less than the thickness δ of the aluminum matrix composites to be welded.

In a friction stir tool according to another embodiment or any of the above embodiments of the present application, the stirring head has a shaft shoulder height t, which is slightly smaller than the radius D of shaft shoulder of the stirring head.

In a friction stir tool according to another embodiment or any of the above embodiments of the present application, the relationship between the shaft shoulder height t and the radius D of shaft shoulder of the stirring head is: t=(0.6~0.95)×D.

In a friction stir tool according to another embodiment or any of the above embodiments of the present application, the relational expression between the radius D of shaft shoulder of the stirring head and the thickness δ of the aluminum matrix composites to be welded is:

$$D = \begin{cases} (2.4\sim2.7)\times\delta, & 3 \le \delta < 5 \\ (2\sim2.4)\times\delta, & 5 \le \delta < 8 \\ (1.5\sim2)\times\delta, & 8 \le \delta < 12 \end{cases}.$$

In a friction stir tool according to another embodiment or any of the above embodiments of the present application, the external surface of the stirring needle is a third conical surface, where the third conical surface has a conical inclined angle β, and the length l of the third conical surface meets the following relational expression:

$$l = (0.5 \sim 1.5) \times [h \div \cos\beta + (D - d - h \times \tan\beta) \times \sin\beta].$$

The technical solutions of the composite brake disc, the preparation method for preparing an aluminum matrix composite brake disc, or the friction stir tool for friction stir processing of aluminum matrix composites to be welded according to the present application bring at least part of the following technical effects, respectively.

The composite brake disc and the preparation method thereof according to the present application can increase the volume fraction of reinforcement particles in the aluminum matrix composite layer, thus increasing wear resistance, can avoid further addition of ceramic particles into the aluminum alloy base layer, thus increasing the strength and elongation of the aluminum alloy base layer, reducing the failure risk, and increasing the thermal conductivity of the aluminum alloy base layer, so that the heat generated by the friction layer is transferred to the air, thus reducing the overall temperature rise of the brake disc. In addition, the aluminum matrix composite layer in the solutions plays the role of a wear-resistant layer, and a transition layer is formed between the aluminum matrix composite layer and the aluminum alloy base layer through metallurgical bonding. The transition layer can prevent the volume fraction of ceramic particles between the aluminum matrix composite layer and the aluminum alloy base layer from changing instantly, thus reducing the stress difference between the aluminum matrix composite layer and the aluminum alloy base layer due to cold and hot fatigue, and increasing the bonding force between the aluminum matrix composite layer and the aluminum alloy base layer, so as to reduce the failure risk due to cracking between the aluminum matrix composite layer and the aluminum alloy base layer as a result of cold and hot fatigue and so on.

In addition, compared with the integral-type cemented carbide friction stir tools, in the friction stir tool according to the present application, the stirring head thereof uses cemented carbide, while the clamping body thereof can be prevented from using expensive cemented carbide, which can not only guarantee the service life of the stirring head and the welding quality, but also greatly reduce the cost. In addition, the friction stir tool according to the present application has a stirring head with a conical surface at the top and a clamping body with a conical surface in the inner cavity. The matching between the conical surfaces can realize automatic centering alignment. At the same time, set screws are employed, so that the problem of "eccentricity" can be avoided and the stable operation of the stirring head can be guaranteed after installation.

BRIEF DESCRIPTION OF THE DRAWINGS

The accompanying drawings of the specification, which form a part of the present application, are used to provide a further understanding of the present invention. The schematic embodiments and depictions of the present invention are used to explain the present invention and do not constitute any improper limitation on the present invention, where.

REFERENCE NUMERALS

| | |
|---|---|
| 110 | aluminum alloy base layer |
| 120 | aluminum matrix composite layer |
| 130 | transition layer |
| 210 | clamping body |
| 220 | stirring head |
| 230 | fixing structure |

DETAILED DESCRIPTION OF EMBODIMENT(S) OF THE INVENTION

The present application will be described in detail hereinafter with reference to the exemplary embodiments shown in the accompanying drawings. However, it should be understood that the present application can be implemented in many different forms, and should not be construed as being limited to the embodiments set forth herein. These embodiments are provided here for the purpose of making the disclosure of the present application more complete and comprehensive, and fully conveying the concept of the present application to those skilled in the art.

In addition, for any single technical feature described or implied in the embodiments mentioned herein or any single technical feature shown or implied in individual drawings, the present invention still allows for any combination or deletion of these technical features (or equivalents thereof) without any technical obstacle, thereby obtaining more other embodiments of the present application that may not be directly mentioned herein.

The present application hereby describes various embodiments of the present invention in conjunction with FIGS. 1-FIG. 10.

Figure 1:
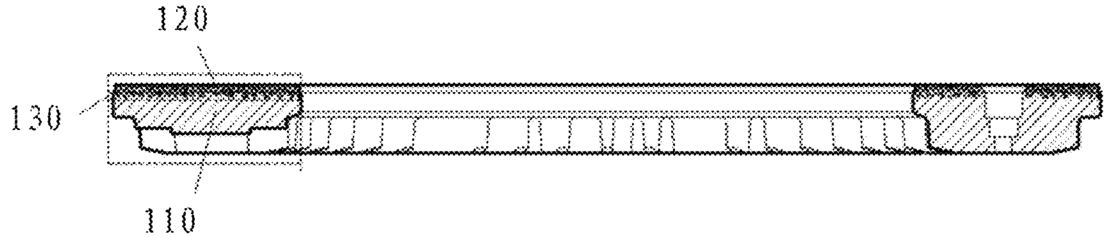
FIG. 1 shows a schematic diagram of the aluminum matrix composite brake disc structure according to the present invention.
Figure 2:
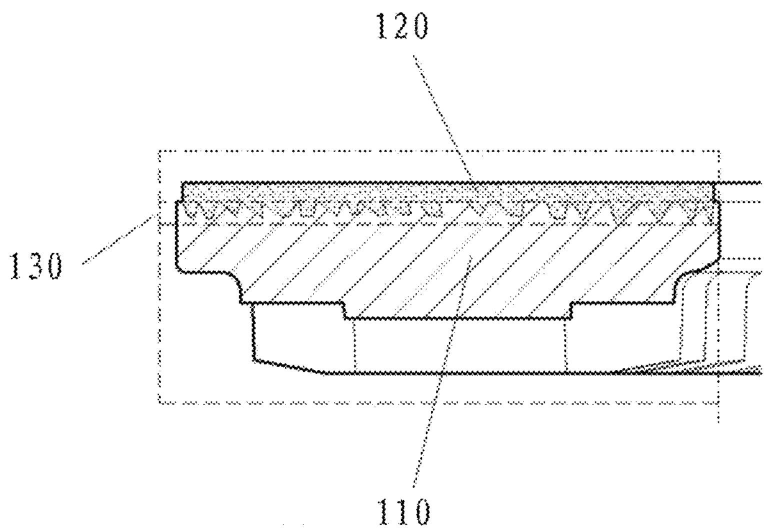
FIG. 2 shows a schematic diagram of the brake disc structure including an aluminum matrix composite layer, a transition layer and an aluminum alloy base layer according to the present invention.

Referring to FIGS. 1 to FIG. 2, the composite brake disc according to the present invention is prepared by friction stir processing of an aluminum alloy base layer 110 and an aluminum matrix composite layer 120 that are made of two different materials. Wherein, aluminum alloy base layer 110 is made of Al—Si alloy or Al—Si—Cu alloy, which mainly plays a carrying role. Al—Si alloy or Al—Si—Cu alloy can be hypoeutectic alloy, eutectic alloy or hypereutectic alloy. In this embodiment, adding a small amount of ceramic particles into the aluminum alloy base layer 110 can improve its mechanical properties, impact resistance and high-temperature resistance.

Aluminum matrix composite layer 120 is an aluminum matrix composite containing ceramic particles. Because of its good friction and wear performance, it plays a role in providing friction braking force. The aluminum matrix composite layer 120 is prepared by casting, powder metallurgy, or spray deposition process. Aluminum matrix composites refer to the addition of SiC, TiN or BN and other ceramic particles into Al—Cu, Al—Si or Al—Mg alloys. Preferably, adding any or more alloy elements such as iridium, zirconium, lanthanum and cerium to the aluminum matrix composite to prepare the aluminum matrix composite layer 120 can improve the performance of the aluminum matrix composite layer 120. The aforementioned ceramic particles are added into the through-holes on the aluminum matrix composite layer 120, and a layer of aluminum plate is covered above the aluminum matrix composite layer 120 added with ceramic particles. The ceramic particles in the through-holes can enter into the surrounding aluminum matrix composites through friction stir processing. Compared with the vacuum stirring casting method in the prior art, the ceramic particles are more evenly distributed in the aluminum matrix composites. This is because the ceramic particles tend to agglomerate, which would lead to defects such as segregation during vacuum stirring casting. In this embodiment, in the composite brake disc prepared according to the present invention, the volume fraction of ceramic particles in the aluminum matrix composite layer 120 is 15%-30%. Preferably, the volume fraction of ceramic particles in the aluminum matrix composite is 20%-30%. The ceramic particle size is 10-40 μm, and the normal distribution value is 10-30 μm. The thickness of aluminum matrix composite layer 120 is 3-10 mm.

On the one hand, the composite brake disc according to the present invention can improve the volume fraction of reinforcement particles in the aluminum matrix composite layer 120, thus increasing wear resistance, can avoid further addition of ceramic particles in the aluminum alloy base layer 110, thus increasing the strength and elongation of the aluminum alloy base layer 110 and reducing failure risk, and can increase the thermal conductivity of the aluminum alloy base layer 110, thus transferring the heat generated by the friction layer to the air to reduce the overall temperature rise of the brake disc. On the other hand, reinforcement particles are more evenly distributed in the aluminum matrix composite layer 120.

Figure 3:
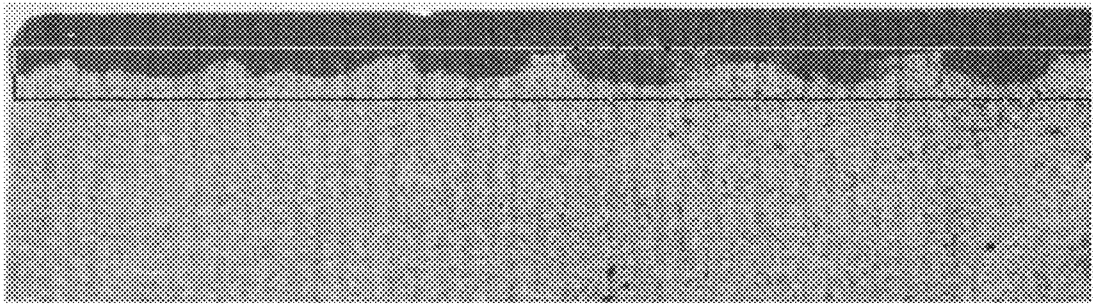
FIG. 3 shows a schematic diagram of the sectional structure of the aluminum matrix composite layer, the transition layer and the aluminum alloy base layer according to the present invention.

The aluminum matrix composite layer 120 and the aluminum alloy base layer 110 are deeply bonded with and enter into each other through metallurgical bonding, and a transition layer 130 is formed between the aluminum matrix composite layer 120 and the aluminum alloy base layer 110. From a macroscopic point of view, the transition layer 130 is composed of aluminum matrix composite layer 120 and aluminum alloy base layer 110. In the diagram of the cross section interface of the composite brake disc, as shown in FIGS. 2 and FIG. 3, the transition layer 130 comprises a reinforced structure, which can increase the bonding force between the aluminum matrix composite layer 120 and the aluminum alloy base layer 110. The reinforced structure refers to the boundary surface between the aluminum matrix composite layer 120 and the aluminum alloy base layer 110 after friction stir processing, where in FIGS. 2 and FIG. 3, it is the boundary line between the two materials. Wherein, FIG. 2 shows a schematic diagram of the structure of the aluminum matrix composite layer 120, the transition layer 130 and the aluminum alloy base layer 110 prepared according to the present invention. FIG. 3 shows the schematic diagram of the cross section of the aluminum matrix composite layer 120, the transition layer 130 and the aluminum alloy base layer 110 according to the present invention. This reinforced structure is a non-planar structure. This non-planar structure is a structure with an irregular shape. Preferably, the irregular-shape structure is a sawtooth and/or inverted trapezoid and/or normal trapezoid structure. The reinforced structure realizes the composition transition between the reinforced aluminum alloy base layer 110 and the aluminum matrix composite layer 120 of the brake disc. The reinforced structure comprises a first reinforced part and a second reinforced part. The first reinforced part refers to a structure that penetrates into the aluminum matrix composite layer 120, which is in a quasi-convex shape, as shown in FIG. 3. From the aluminum alloy base layer 110 to the first reinforced part, the material composition of the aluminum alloy base layer 110 and SiC particles increase in gradient. From the first reinforced part to the aluminum matrix composite layer 120, the material composition of the aluminum matrix composite layer 120 and SiC particles increase in gradient. The second reinforced part refers to a structure that penetrates into the aluminum alloy base layer 110, which is in a quasi-concave shape, as shown in FIG. 3. From the aluminum matrix composite layer 120 to the second reinforced structure, the composition of aluminum matrix composite and SiC particles decreased in gradient. From the second reinforced part to the aluminum alloy base layer 110, the material composition of the aluminum alloy base layer 110 increases in gradient, while the SiC particles decrease in gradient. The distance between the vertex of the first reinforced structure and the vertex of the second reinforced structure is the thickness of the transition layer 130. The thickness of the transition layer 130 is from 1-5 mm. The elongation of the transition layer 130 is A≥1%. From the perspective of microstructure, the micro-crystal size of the transition layer 130 is smaller than that of the aluminum alloy base layer 110 and that of the aluminum matrix composite layer 120. The length of micro-crystal particles in the transition layer 130 is ≤10 μm.

Figure 4:
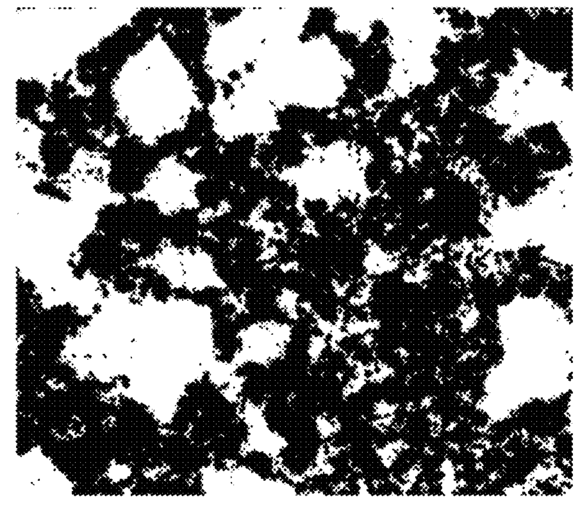
FIG. 4 shows a diagram of the metallographic structure of the aluminum matrix composite brake disc without friction stir processing.
Figure 5:
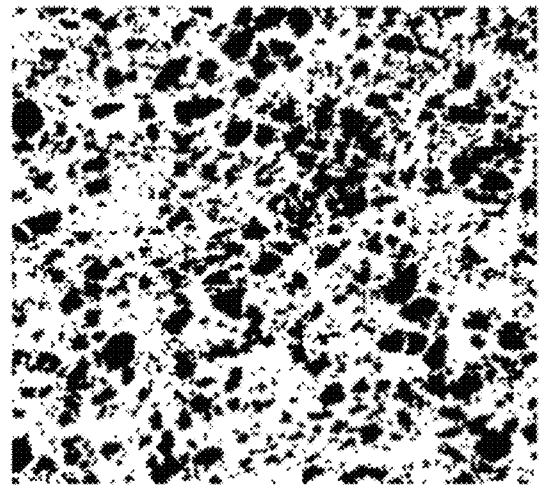
FIG. 5 shows a diagram of the metallographic structure of the aluminum matrix composite brake disc after friction stir processing.

By comparing FIG. 4 and FIG. 5, it can be seen that the metallographic structure particles of composite brake discs without stir casting are larger, as shown in FIG. 4. The metallographic structure particles of composite brake discs after stir casting processing are smaller, as shown in FIG. 5.

Figure 6:
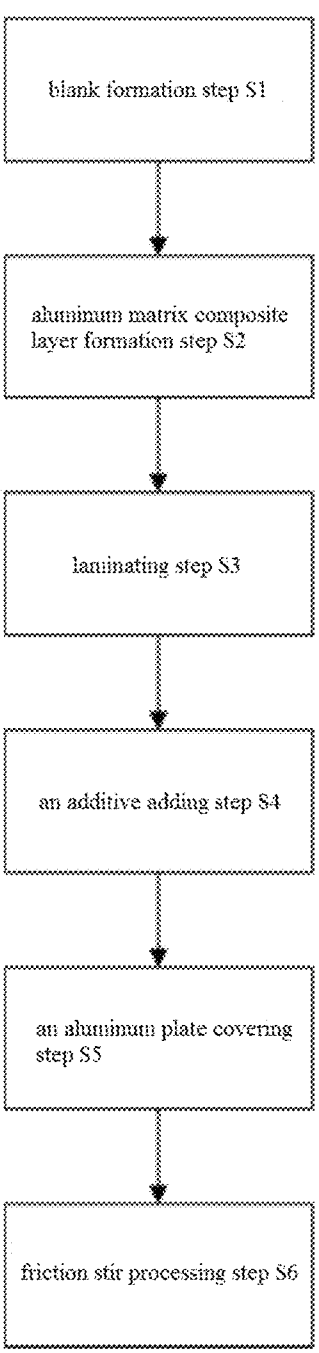
FIG. 6 shows a schematic diagram of an embodiment of the process flow according to the present invention.

The preparation method for preparing composite brake discs in any of the foregoing embodiments or combinations thereof will be further described below with reference to FIG. 6. The preparation method in this embodiment may include the following steps:

S1: The step of forming aluminum alloy base layer by casting process using Al—Si alloy or Al—Si—Cu alloy as the base alloy. First, aluminum ingot is formed by using Al—Si alloy or Al—Si—Cu alloy or Al—Si(—Cu) alloy containing a small amount of ceramic particles as the base alloy, and aluminum-strontium alloy modifier and aluminum-titanium-boron refiner are calculated and weighed according to the weight of the aluminum ingot. Then, the aluminum ingot, aluminum-strontium alloy modifier and aluminum-titanium-boron refiner are put into the oven for baking to remove moisture. The dried aluminum ingot is heated to 700-800° C. When the aluminum ingot is completely melted, aluminum-strontium alloy modifier, refining agent and aluminum-titanium-boron refiner are added into the aluminum ingot. At the same time, argon is injected into the molten aluminum for degassing treatment, where the degassing time is 30-50 minutes. The temperature of molten aluminum is controlled at 700-720° C. A special brake disc metal mold is used, and low-pressure pouring is adopted to pour the aluminum alloy base layer, where the pouring process includes liquid raising, mold filling, crusting, pressure maintaining and pressure relief. Finally, the mold is open to take out the aluminum alloy base layer casting. The aluminum alloy base layer is initially processed according to the overall dimensions of the brake disc profile to obtain the aluminum alloy base layer.

The main part of the brake disc is an aluminum alloy base layer, which requires high strength. In the aluminum alloy base layer prepared according to this embodiment, by adding refiners, refining agents and modifiers into the molten aluminum, the aluminum ingot structure thus formed is more evenly-distributed and has sufficient strength, which can reduce the risk of deformation, cracks and other failures during use. The properties of the aluminum alloy base layer prepared according to this embodiment are as follows: Rm≥230 MPa, elongation ≥2, hardness ≥90 HB.

S2: The step of forming an aluminum matrix composite layer using aluminum matrix composites, which comprises an aluminum matrix circular plate formation step S21 and a through-hole formation step S22.

In aluminum matrix circular plate formation step S21, firstly, the amount of modifier and refiner is weighed according to the weight ratio of the aluminum. The reinforcement particles are sieved to remove agglomerated particle clusters and other impurities, and the reinforcement particles are then put into the oven for roasting pretreatment at a temperature of 200-500° C. to remove surface impurities and moisture. In this embodiment, reinforcement particles refer to ceramic particles such as SiC, TiN or BN. The aluminum ingot, modifier and refiner are baked in the oven to remove moisture. The aluminum ingot is heated to 650-800° C. After the aluminum ingot is completely melted, alloying materials, modifier and refining agent are added. At the same time, argon is injected into the molten aluminum for degassing treatment, where the degassing time is 30-50 minutes. The temperature of molten aluminum is controlled at 600-800° C., and then rolled into plates.

In the through-hole formation step S22, the aluminum matrix composite layer is punched into a circular aluminum matrix composite layer with an outer diameter of 600-800 mm and an inner diameter of 250-350 mm. The circular aluminum matrix composite layer is distributed with a plurality of through-holes with a diameter of 5-7 mm. The through-holes are all over the entire circular plate, and the plurality of through-holes is arranged in array form on the aluminum matrix composite layer. The thickness of the aluminum matrix composite layer prepared according to this embodiment is 3-7 mm. The properties of aluminum matrix composite layer are as follows: Rm≥200 MPa, elongation≥0.5, hardness≥80 HB.

S3: The aluminum matrix composite layer is stacked on the aluminum alloy base layer to form a stacked composite structure. Firstly, the aluminum alloy base layer is fixed on the friction stir worktable, and the aluminum matrix composite layer is stacked on the aluminum alloy base layer to form a composite structure. In this composite structure, the aluminum alloy base layer is placed below the aluminum matrix composite layer. Therefore, the bottoms of the through-holes of the aluminum matrix composite layer are closed by the aluminum alloy base layer, thus forming through-holes in array form which are closed at the bottom.

S4: SiC particles are weighed as reinforcement particles and baked at high temperature in advance to remove surface impurities. During high-temperature baking, a layer of SiO2 oxidation film will be formed on the surface of SiC particles, which can improve the contact wettability of SiC particles and aluminum alloy base layer. The weighed SiC particles are added into the matrix through-holes on the aluminum matrix composite layer, filling the through holes with reinforcement particles.

S5: After the through-holes are filled with reinforcement particles, a layer of aluminum plate is used to cover the reinforcement particles above the aluminum matrix composite layer, where the thickness of aluminum plate is 0.5~1 mm. On the one hand, the aluminum plate can cover the SiC particles to prevent the SiC particles from splashing during the subsequent friction stir processing. On the other hand, the aluminum plate, by bonding with the aluminum matrix composite layer in the subsequent friction stir processing, improves the tenacity of the aluminum matrix composite layer. At the same time, it can reduce the direct contact between the stirring head and the SiC particles, thus reducing the wear of the stirring needle at the bottom of the stirring head.

S6: Friction stir processing is performed on the composite structure surface of the aluminum alloy base layer and the aluminum matrix composite layer. The surface refers to the upper surface of the aluminum matrix composite layer. When there is an aluminum plate covering the reinforcement particles, the surface is the upper surface of the covering aluminum plate, but not the lower surface contacting the aluminum alloy base layer. The friction stir processing specifically includes two parts, i.e., the mixing step S61 and the cooling step S62 after the mixing step.

The mixing step S61 refers to the step of mixing the aluminum alloy base layer and the aluminum matrix composite layer at the portion where they are in contact with each other to create a transition layer 130. Specifically, it refers to the step of fully mixing the portion where the aluminum alloy base layer 110 and the aluminum matrix composite layer 120 are in contact with each other. During friction stir processing, the aluminum alloy base layer 110 and the aluminum matrix composite layer 120 enter into and are fully mixed with each other at the boundary surface where they are in contact with each other, and the transition layer 130 is formed from the fully mixed part. The cooling step S62 refers to the step of cooling after the aluminum alloy base layer and the aluminum matrix composite layer are mixed at the portion where they are in contact with each other, so that a reinforced structure connecting the aluminum alloy base layer and the aluminum matrix composite layer 120 can be formed in the transition layer 130. During the cooling process, a transition layer 130 is formed between the aluminum alloy base layer and the aluminum matrix composite layer, so that an aluminum matrix composite brake disc with a transition layer 130 is thus obtained, where the transition layer 130 is formed from the mixed part. In step S61, during the process that the aluminum alloy base layer and the aluminum matrix composite layer 120 enter into and fully mixed with each other at the boundary surface part where are in contact with each other, the boundary surface where they are in contact with each other deforms, and gradually forms a reinforced structure with the cooling step. The processes of step S61 and step S62 are partially overlapped, that is, the formation process of the transition layer 130 and the formation process of the reinforced structure are overlapped, and part of them are carried out at the same time.

During friction stir processing, the stirring speed of the friction stir processing is 600-1200 rpm, and the feed speed is 100-500 mm/min. The friction stir processing tool includes a stirring head, which is used to heat the surface of the aluminum matrix composite layer to a plastic state by high-speed rotation, and squeeze the SiC particles in the small holes into the aluminum matrix composite layer. At the same time, a transition layer 130 is formed between the aluminum matrix composite layer and the aluminum alloy base layer during friction stir processing, which can bond the aluminum alloy base layer and the aluminum matrix composite layer together. This bonding mode is referred to as metallurgical bonding. During friction stir processing, the original dendrites near the contact surface of the aluminum alloy base layer and the aluminum matrix composite layer are broken to obtain a structure with finer and more uniformly-distributed grains. Therefore, the bonding force between the aluminum alloy base layer and the aluminum matrix composite layer is enhanced.

S7: The blank seam on the surface of the aluminum matrix composite brake disc made in step 6 is removed, and the processing of the reference plane of the aluminum matrix composite brake disc is completed.

The aluminum matrix composite brake disc prepared according to the preparation method of the present invention is different from the integral-type brake disc in the prior art in that: the aluminum matrix composite brake disc prepared according to the preparation method of the present invention is composed of different materials. Integral-type brake disc refers to an aluminum matrix composite brake disc with the entire brake disc made of the same aluminum matrix composite. In the prior art, the integral-type aluminum matrix composite brake disc is mainly prepared using the vacuum stirring casting method, where the entirety of the aluminum matrix composite brake disc is made of the same ceramic particle reinforced aluminum matrix composite. Because of the high hardness of ceramic particles, increasing the amount of ceramic particles will enhance the wear resistance of the brake disc, but at the same time will reduce the tenacity of the brake disc, thereby reducing the overall mechanical properties of the brake disc. Therefore, in the prior art, the amount of ceramic particles added is usually about 20%, and if the amount exceeds 20%, the aluminum matrix composite brake disc containing ceramic particles will have poor comprehensive mechanical properties. In addition, the vacuum stirring casting equipment is relatively expensive, so the cost of preparing aluminum matrix composite brake discs by the stirring casting process is relatively high.

Figure 7:
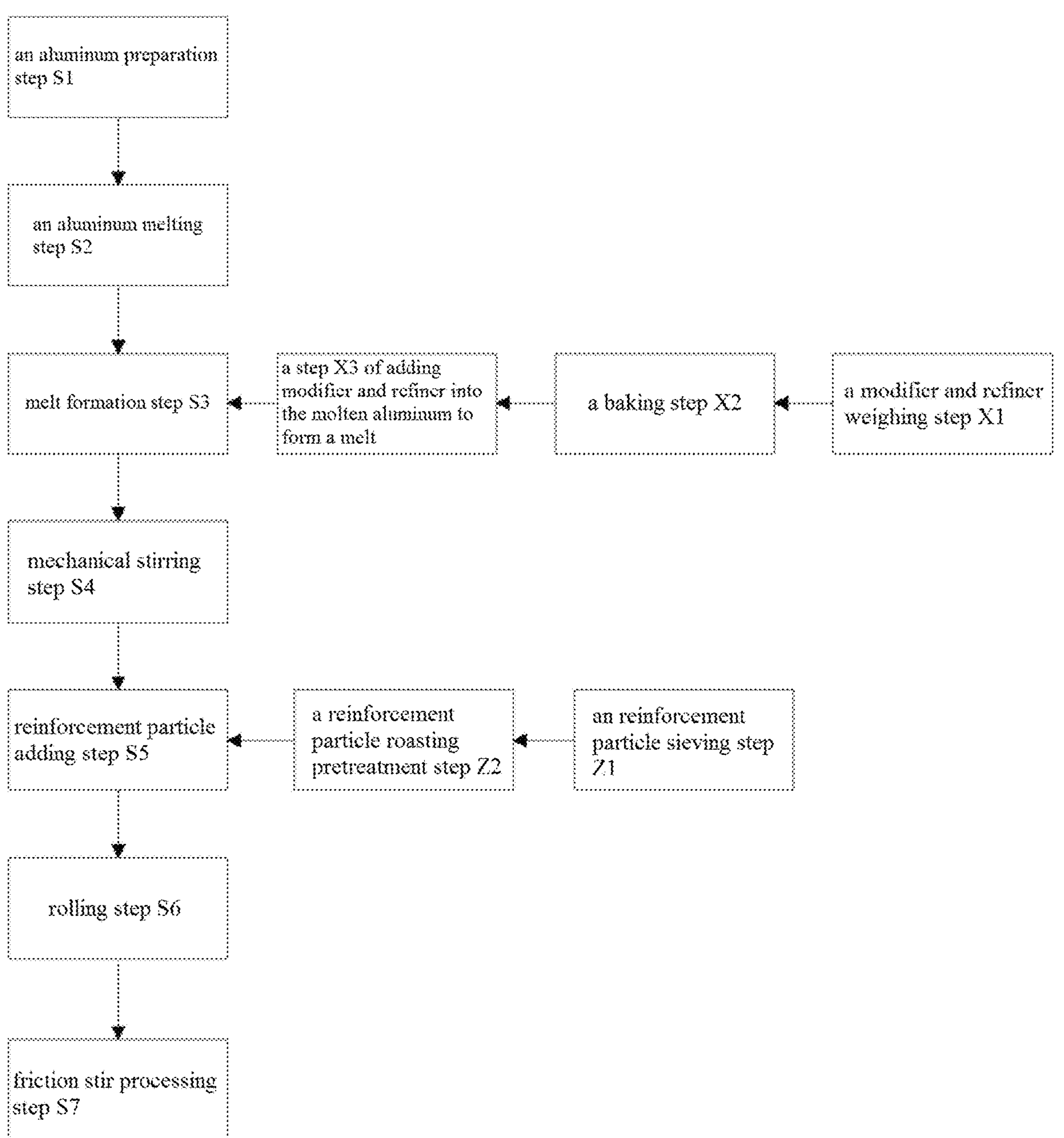
FIG. 7 shows a schematic diagram of another embodiment of the process flow according to the present invention.

The preparation method for preparing the composite brake disc in any of the above embodiments or combinations thereof will be further described below in combination with FIG. 7. The preparation method in this embodiment may comprise the following steps:

S1: Aluminum preparation step. Aluminum matrix composites are used as raw materials. In this embodiment, the aluminum matrix composite refers to the aluminum matrix composite in which SiC, TiN or BN and other ceramic particles are added into the Al—Cu or Al—Si or Al—Mg alloys. First, aluminum is prepared.

X1: Modifier and refiner weighing step. Weigh the amount of modifier and refiner according to the weight ratio of aluminum.

X2: Baking step. Put the weighed aluminum, modifier and refiner into the oven for baking to remove moisture.

Z1: Reinforcement particle sieving step. Sieve the reinforcement particles to remove agglomerated particle clusters and other impurities, and screen out reinforcement particles with SiC particles having a particle size of 10-40 μm, and a normal distribution value of 10-30 μm that are normally distributed.

Z2: Reinforcement particle roasting pretreatment step. Put the sieved reinforcement particles into the oven for roasting pretreatment at a temperature of 300-400° C. to remove surface impurities and moisture. At the same time, a layer of SiO2 oxidation film is formed on the surface of SiC particles to improve the contact wettability of SiC particles and aluminum matrix.

S2: Aluminum melting step. The baked aluminum is heated under vacuum condition to 700-800° C. to completely melt the aluminum.

X2: Step of adding modifier and refiner into molten aluminum. After the aluminum is completely melted at high temperature, the modifier and refiner that are baked and dried and the alloying materials are added into the fully melted molten aluminum.

S3: The fully melted molten aluminum added with alloying materials, modifiers and refiners gradually forms a melt. While adding alloying materials, modifiers and refiners, argon is injected into the molten aluminum for degassing and refining to remove water vapor and slag inclusions in the melt, so as to effectively purify the melt. The degassing and refining time is 15-30 minutes.

S4: After degassing, the melt is mechanically stirred, and the motor speed is 500-600 rpm.

S5: Step of adding reinforcement particles. While the melt is mechanically stirred, the pretreated SiC particles are added into the melt at a constant speed. The speed of adding SiC particles is 2-5 g/s. After the SiC powder is fully added, the motor speed is adjusted to 800 rpm, and the SiC particles in the melt are stirred evenly.

S6: When SiC particles are fully dispersed and uniformly distributed in the melt, the temperature of the melt is controlled at 700-720° C., and the melt is rolled into plates under vacuum condition, thus obtaining SiC particle reinforced aluminum matrix composite plates. The properties of the aluminum matrix composite layer plate prepared according to the present invention are as follows: Rm≥200 MPa, elongation≥0.5, hardness≥80 HB.

S7: The step of friction stir processing of the aluminum matrix composite layer and the pre-prepared aluminum alloy base layer to bond the aluminum matrix composite layer with the aluminum alloy base layer. Friction stir processing is performed on the composite structure surface of the aluminum alloy base layer and the aluminum matrix composite layer. The surface refers to the upper surface of the aluminum matrix composite layer, but not the lower surface in contact with the aluminum alloy base layer. The friction stir processing specifically includes two parts, i.e., a mixing step S71 and a cooling step S72 after the mixing step.

Similar to the previous embodiment of the method, the mixing step S71 refers to the step of mixing the portion where the aluminum alloy base layer and the aluminum matrix composite layer are in contact with each other. The cooling step S72 refers to the step of cooling after the portion where the aluminum alloy base layer and the aluminum matrix composite layer are in contact with each other are mixed. During the cooling step, a transition layer 130 is formed between the aluminum alloy base layer and the aluminum matrix composite layer, so that an aluminum matrix composite brake disc with a transition layer 130 is thus obtained, where the transition layer 130 is formed from the mixed part.

During friction stir processing, the stirring speed of the friction stir processing is 600-1200 rpm, and the feed speed is 100-500 mm/min. The friction stir processing tool includes a stirring head, which is used to heat the surface of the aluminum matrix composite layer to a plastic state through high-speed rotation, and squeeze the SiC particles in the small holes into the aluminum matrix composite layer. At the same time, a transition layer 130 is formed between the aluminum matrix composite layer and the aluminum alloy matrix layer during friction stir processing, which can bond the aluminum alloy base layer and the aluminum matrix composite layer together. This combination mode is referred to as metallurgical bonding. During friction stir processing, the original dendrites near the contact surface of the aluminum alloy base layer and the aluminum matrix composite layer are broken to obtain a structure with finer and more uniformly-distributed grains. Therefore, the bonding force between the aluminum alloy base layer and the aluminum matrix composite layer is enhanced.

S8: Remove the blank seam on the brake disc surface made in step S7, and complete the processing of the brake disc reference plane.

The steps of preparing the pre-prepared aluminum alloy base layer according to the present invention are similar to step S1 in another embodiment of the method as previously mentioned, specifically:

The step of forming aluminum alloy base layer by casting process using Al—Si alloy or Al—Si—Cu alloy as the base alloy comprises: firstly, aluminum ingot is formed by using Al—Si alloy or Al—Si—Cu alloy or Al—Si (copper) alloy containing a small amount of ceramic particles as the base alloy, and aluminum-strontium alloy modifier and aluminum-titanium-boron refiner are calculated and weighed according to the weight of the aluminum ingot. Then, the aluminum ingot, aluminum-strontium alloy modifier and aluminum-titanium-boron refiner are put into the oven for baking to remove moisture. The dried aluminum ingot is heated to 700-800° C. When the aluminum ingot is completely melted, aluminum-strontium alloy modifier, refining agent and aluminum-titanium-boron refiner are added into the aluminum ingot. At the same time, argon is injected into the molten aluminum for degassing treatment, where the degassing time is 30-50 minutes. The temperature of molten aluminum is controlled at 700-720° C. A special brake disc metal mold is used, and low-pressure pouring is adopted to pour the aluminum alloy base layer, where the pouring process includes liquid raising, mold filling, crusting, pressure maintaining and pressure relief. Finally, the mold is open to take out the aluminum alloy base layer casting. The aluminum alloy base layer is initially processed according to the overall dimensions of the brake disc profile to obtain the aluminum alloy base layer.

The main part of the brake disc is an aluminum alloy base layer, which requires high strength. In the aluminum alloy base layer prepared according to this method, by adding refiners, refining agents and modifiers into the molten aluminum, the aluminum ingot structure thus formed is more evenly-distributed and has sufficient strength, which can reduce the risk of deformation, cracks and other failures during use. The properties of the aluminum alloy base layer prepared according to this method are as follows: Rm≥230 MPa, elongation≥2, hardness≥90 HB.

The brake disc prepared according to the above method is prepared by friction stir processing using aluminum alloy base layer and aluminum matrix composite layer 120 plate that are made of two different materials. Friction stir processing can improve the defects such as pores and slag inclusions in the aluminum matrix composite layer 120 plate prepared according to the present invention, and can improve the mechanical properties of the aluminum matrix composite layer 120 plate, thus improving the overall mechanical properties of the brake disc.

According to the above depiction, it can be seen that the aforementioned embodiments of the composite brake disc and the preparation method thereof according to the present invention have achieved the following technical effects:

1. The composite brake disc of the present invention can improve the volume fraction of reinforcement particles in the aluminum matrix composite layer, thus increasing the wear resistance, can avoid further addition of ceramic particles into the aluminum alloy base layer, thus increasing the strength and elongation of the aluminum alloy base layer and reducing the failure risk, and can increase the thermal conductivity of the aluminum alloy base layer, so that the heat generated by the friction layer is transferred to the air, thus reducing the overall temperature rise of the brake disc.
2. In the prior art, for the aluminum matrix composite brake disc prepared by vacuum stirring casting, the entirety thereof adopts the same ceramic particle reinforced aluminum matrix composite. During the preparation process, the ceramic particles are prone to produce segregation defects in the aluminum matrix composite, which leads to poor mechanical performance of the brake disc. Compared with the prior art, the ceramic particles in the aluminum matrix composite brake disc prepared by the preparation method according to the present invention are more evenly distributed, and the aluminum matrix composite brake disc has good wear resistance and tenacity.
3. In the prior art, the amount of ceramic particles added to the aluminum matrix composite brake disc prepared by vacuum stirring casting is limited, because the addition of ceramic particles will improve wear resistance but at the same time reduce tenacity. Therefore, the amount of ceramic particles added to the aluminum matrix composite brake disc prepared in the prior art is about 20%, so as to ensure the aluminum matrix composite brake disc has sufficient wear resistance and tenacity is not too low at the same time. Compared with the prior art, the internal structure of the aluminum matrix composite brake disc prepared according to the present invention is more uniform. When the amount of ceramic particles added is more than 20%, the aluminum matrix composite brake disc will still have good tenacity, and can at the same time improve the wear resistance, so the overall mechanical performance of the aluminum matrix composite brake disc is better.
4. Compared with the existing vacuum stirring casting method, which is prone to produce defects such as pores and slag inclusions, the preparation method provided in the present invention can prepare an aluminum matrix composite brake disc that has more uniform structure and fewer defects, which has better mechanical properties than the aluminum matrix composite brake disc of the prior art.
5. In the prior art, the aluminum alloy base layer and the wear-resistant layer are connected by mechanical bonding, where the bonding force is relatively poor. The aluminum matrix composite layer of the composite brake disc of the present invention plays the role of the wear-resistant layer, and a transition layer is formed between it and the aluminum alloy base layer by metallurgical bonding. The transition layer can prevent the volume fraction of ceramic particles between the aluminum matrix composite layer and the aluminum alloy base layer from changing instantly, thereby reducing the stress difference between the aluminum matrix composite layer and the aluminum alloy base layer due to cold and hot fatigue, and increasing the bonding force between the aluminum matrix composite layer and the aluminum alloy base layer, so as to reduce the risk of cracks and other failures between the aluminum matrix composite layer and the aluminum alloy base layer during cold and hot fatigue.

6. Compared with the prior art, the expensive vacuum stirring casting equipment is not used, which greatly reduces the production cost.
7. In the prior art, the vacuum stirring casting process needs to be carried out at high temperature, so the operators may have operational safety risks such as scald during operation. However, the friction stir processing according to the present invention can be carried out at normal temperature, which simplifies the process and ensures the safety of process operation.
8. The preparation method according to the present invention can improve the fraction of ceramic particles on the surface of the aluminum matrix composite, which increases the wear resistance. Compared with vacuum stirring casting, the brake disc base has no ceramic particles added, which can effectively improve the comprehensive mechanical properties such as the elongation of the base, reduce the failure risk, and increase the thermal diffusion coefficient of the brake disc, thus transferring the heat generated by the friction layer to the air to reduce the temperature rise of the brake disc.
9. In the preparation method according to the present invention, the aluminum matrix composite thus prepared is specially used for the preparation of brake discs. Compared with the prior art, the present invention has sieved the size of reinforcement particles, and the reinforcement particles are in normal distribution, where large particles are conducive to improving the braking performance of the brake disc, and small particles can improve the wear resistance of the brake disc, thus improving the overall mechanical performance of the brake disc.
10. In the preparation method according to the present invention, in the process of preparing the aluminum matrix composite layer, a roasting pretreatment is performed on the reinforcement particles to form a layer of $SiO_2$ oxidation film to increase the wettability between the reinforcement particles and the aluminum matrix composite, thus improving the performance of the composite material, so as to meet the requirements of using the aluminum matrix composite to prepare the brake disc.

Figure 8:
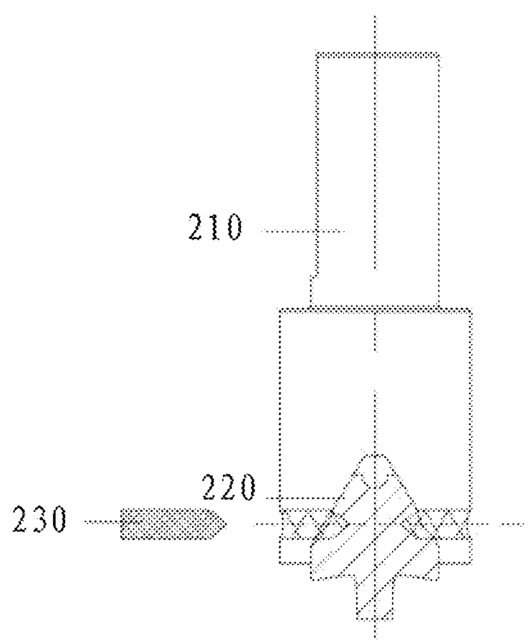
FIG. 8 shows a schematic diagram of the combined-type structure according to the present invention.
Figure 9:
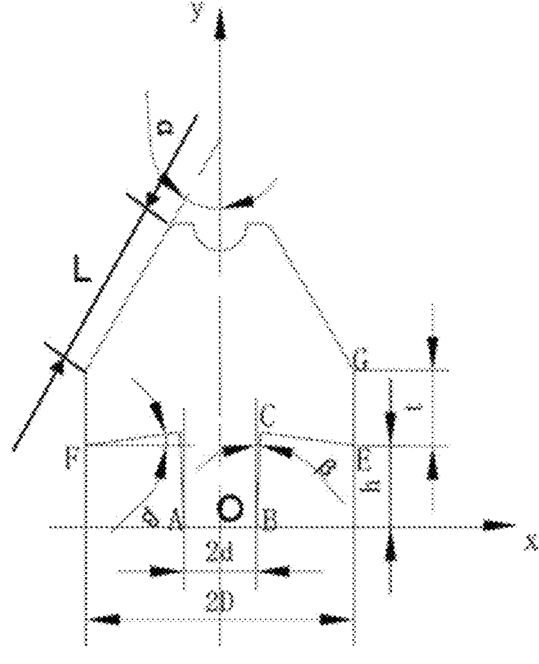
FIG. 9 shows a schematic diagram of the stirring head structure according to the present invention.
Figure 10:
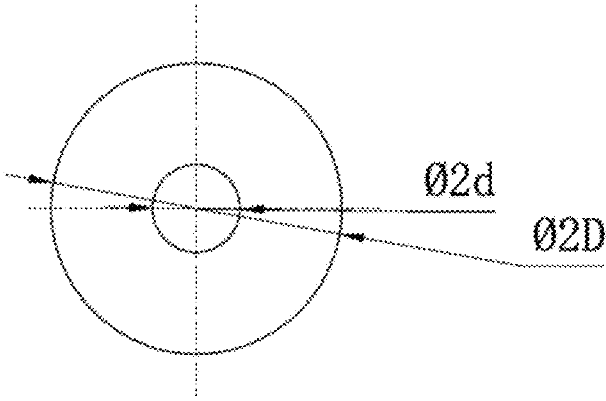
FIG. 10 shows a bottom view of the stirring head according to the present invention.

In addition, a tool for performing the friction stir processing steps in the method for preparing composite brake discs in any of the foregoing embodiments or combinations thereof will also be further described below in combination with FIGS. 8 to FIG. 10. Specifically, such a tool can be a combined-type friction stir tool, which has a clamping body 210 and a stirring head 220 installed on the clamping body 210. The clamping body 210 and the stirring head 220 can be separated. In this embodiment, the clamping body 210 is used to clamp the stirring head 220, so that the stirring head 220 can rotate at a high speed to realize friction stir processing of the aluminum matrix composite to be welded. When the friction stir tool in this embodiment is working, the rotation speed of the stirring head 220 is 600-1200 rpm, and the feed speed is 100-300 mm/min. In order to save costs, different from the existing integral-type friction stir tool, the entirety of which is made of relatively expensive cemented carbide, the clamping body 210 uses the relatively inexpensive tool steel, which is H13 tool steel in this embodiment, while the stirring head 220 still uses the cemented carbide, which is YG16 cemented carbide in this embodiment. In this way, on the one hand, the cost is greatly reduced by using H13 tool steel instead of cemented carbide as the clamping body 210, and on the other hand, YG16 cemented carbide is used as the stirring head 220 to ensure the service life of the stirring head and the welding quality. The friction stir tool used for friction stir processing of aluminum matrix composite to be welded also includes a fixing structure 230, which is used to radially act on and fix the clamping body 210 and the stirring head 220. Two fixing structures 230 clamp the clamping body 210 and the stirring head 220 radially, so as to play the role of fixing the clamping body 210 and the stirring head 220 to prevent them from separation. In this embodiment, the fixing structure 230 is a set crew.

The stirring head 220 has a first conical surface, which is in contact with the clamping body 210. The clamping body 210 has a corresponding second conical surface. The first conical surface and the second conical surface have the same slope, so that they are in contact with each other and are tightly fit together. The axis of the first conical surface coincides with the axis of the second conical surface, and the central axis of the first conical surface, the central axis of the second conical surface, the central axis of the clamping body 210 and the central axis of the stirring head 220 coincide. Therefore, when the stirring head 220 is being installed and the friction stir tool is working, due to the vertical force, the clamping body 210 can overlap with the central axis of the stirring head 220 through the fitting of the first conical surface and the second conical surface, thus realizing the self-positioning of the stirring head 220 on the clamping body 210. In order to fix the clamping body 210 and the stirring head 220, the fixing structures 230 are used to clamp them together tightly by means of the radial force. In this embodiment, firstly, a conical bore is opened on the first conical surface of the stirring head 220. The conical bore enters part of the stirring head 220, but there is still a certain distance from the central axis of the stirring head 220. A threaded hole is opened at the corresponding position of the clamping body 210. The central axis of the threaded hole coincides with the central axis of the conical bore, and the diameter of the conical bore is the same as that of the threaded hole. The fixing structure 230 is screwed horizontally into the conical bore of the stirring head 220 from the clamping body 210. The end of the fixing structure 230 is a conical surface, which has the same slope as the conical surface of the conical bore of the stirring head 220, and can achieve a tight fit with it. The top of the fixing structure 230 is fitted with the top of the conical bore. When the fixing structure 230 is screwed into the first conical surface of the stirring head 220, the stirring head 220 is subjected to both radial and axial forces. The two fixing structures 230 are on the same horizontal line and their tops are against each other. When the stirring head 220 rotates at high speed, its position will not change due to the radial force, and it will be firmly fixed with the clamping body 210 due to the axial force, which ensures the accuracy and stability of the installation of the stirring head 220 and the clamping body 210.

The stirring head 220 of the present invention is mushroom-like in shape, and its surface in contact with the clamping body 210 is the first conical surface. In this embodiment, the length of the first conical surface is L. The included angle between the first conical surface and the axis of the stirring head 220 is $\alpha$. The front view of the stirring head is shown in FIG. 2. In FIG. 2, the stirring head 220 has a cylindrical-like stirring needle with a circular undersurface. The central axis vertices of the undersurface of the stirring needle are A and B, respectively. The distance between A and B is the diameter of the undersurface of the stirring needle, which is 2d, and the radius of the undersurface of the stirring needle is d. The stirring needle has a mushroom-like shaft shoulder. In FIG. 2, the central axis vertices of the undersurface of the shaft shoulder are E and F. The distance between E and F is the diameter of the shaft shoulder, which is 2D, and the radius of the shaft shoulder is D. The distance from the shaft shoulder vertex E to the undersurface of the stirring needle is h. The shaft shoulder intersects with the first conical surface of the stirring head 220 to form the shaft shoulder. In FIG. 2, GE is the shaft shoulder. In addition, in this embodiment, the outer surface of the stirring needle is the third conical surface, and the angle between the third conical surface and the axis of the stirring head is β. In FIG. 2, the length of the third conical surface is BC, where BC is 1. The central axis of the stirring head 220 coincides with the central axis of the stirring needle. The midpoint O of AB is on the above central axis. Coordinate axes are established with point O as the origin point, where the abscissa is the x axis, and the ordinate is the y axis.

Embodiments 1-10

The specific implementations are shown in Table 1.

TABLE 1

| Embodiment number | Stirring needle material | Clamping body material | Base material to be welded δ/mm | D/mm | d/mm | t/mm | h/mm | L/mm | l/mm | α/° | β/° |
|---|---|---|---|---|---|---|---|---|---|---|---|
| 1 | YG16 cemented carbide | H13 Tool steel | 4.5 | 11.25 | 3.75 | 9 | 4.3 | 4.219 | 4.623 | 30 | 2.5 |
| 2 | YG16 cemented carbide | H13 Tool steel | 5 | 11.25 | 3.75 | 9 | 4.8 | 5.424 | 5.311 | 40 | 4 |
| 3 | YG16 cemented carbide | H13 Tool steel | 7 | 15.75 | 5.25 | 12.56 | 6.8 | 4.992 | 7.162 | 25 | 2 |
| 4 | YG16 cemented carbide | H13 Tool steel | 9 | 16.2 | 5.4 | 12.96 | 8.8 | 6.969 | 9.353 | 35 | 3 |
| 5 | YG16 cemented carbide | H13 Tool steel | 10 | 18 | 6 | 14.4 | 9.8 | 4.617 | 10.008 | 20 | 1 |
| 6 | YG16 cemented carbide | H13 Tool steel | 3 | 7.5 | 2.5 | 6 | 2.8 | 3.226 | 3.225 | 35 | 5 |
| 7 | YG16 cemented carbide | H13 Tool steel | 3.5 | 8.75 | 2.917 | 7 | 3.3 | 2.773 | 3.650 | 25 | 3.5 |
| 8 | YG16 cemented carbide | H13 Tool steel | 7.5 | 16.875 | 5.625 | 13.5 | 7.3 | 8.135 | 7.879 | 40 | 3 |
| 9 | YG16 cemented carbide | H13 Tool steel | 8.5 | 15.3 | 5.1 | 12.24 | 8.3 | 8.114 | 8.685 | 45 | 2.2 |
| 10 | YG16 cemented carbide | H13 Tool steel | 11 | 19.8 | 6.6 | 15.84 | 10.8 | 3.843 | 11.688 | 15 | 4 |

According to the above data, the dimensions of the stirring head 220 meet the following relationships:

$$L=(0.5\sim 1)\times D\times \sin\alpha;$$

$$h=\delta-0.2;$$

-continued $$d=(0.25\sim 0.45)D$$

$$t=(0.6\sim 0.95)\times D;$$

$$D=\begin{cases}(2.4\sim 2.7)\times\delta,\ 3\le\delta<5\\ (2\sim 2.4)\times\delta,\ 5\le\delta<8\\ (1.5\sim 2)\times\delta,\ 8\le\delta<12\end{cases};$$

$$1=(0.5\sim 1.5)\times[h\div\cos\beta+(D-d-h\times\tan\beta)\times\sin\beta];$$

The coordinate equation of point C is:

$$\begin{cases}x_c=BC\times\sin\beta+d\\ y_c=BC\times\cos\beta\end{cases}$$

According to the above depiction, it can be seen that the aforementioned embodiments of the friction stir tool of the present invention achieves the following technical effects:

1. Compared with the integral-type cemented carbide friction stir tool, in the combined-type friction stir tool proposed by the present invention, the stirring head adopts cemented carbide, while the clamping body can be prevented from using expensive cemented carbide, which can not only ensure the service life of the stirring head and the welding quality, but also greatly reduce the cost.
2. In the friction stir tool proposed by the present invention, it has a stirring head with a conical surface at the top and a clamping body with a conical surface in the inner cavity. The matching between the conical surfaces can realize automatic centering alignment. At the same time, screws are used for fixing, so as to avoid the problem of "eccentricity" and ensure the stable operation of the stirring head after installation.

The above examples mainly illustrate a composite brake disc, the preparation method thereof and a friction stir tool according to the present invention. Although only some of the embodiments of the present invention are described, those skilled in the art should understand that the present invention can, without departing from the spirit and scope of the present invention, be implemented in many other forms. Therefore, the illustrated examples and embodiments are to be considered as illustrative but not restrictive, and the present invention may cover various modifications or replacements if not departed from the spirit and scope of the present invention as defined by the appended claims.

What is claimed is:

1. A composite brake disc, comprising:

an aluminum alloy base layer, and an aluminum matrix composite layer;

wherein, the aluminum alloy base layer and the aluminum matrix composite layer are bonded by laminating the aluminum alloy base layer and the aluminum matrix composite layer; and friction stir processing from a composite structure surface of the aluminum alloy base layer and the aluminum matrix composite layer such that the aluminum alloy base layer and the aluminum matrix composite layer are bonded with each other through metallurgical bonding to form a transition layer, where the transition layer comprises a reinforced structure formed at a boundary surface where the aluminum alloy base layer and the aluminum matrix composite layer are bonded with each other;

wherein the transition layer has a reconstructed metallographic structure, where the metallographic structure of the transition layer is different from that of the aluminum alloy base layer and that of the aluminum matrix composite layer, so that a bonding force is created between the aluminum alloy base layer and the aluminum matrix composite layer.

2. The composite brake disc according to claim 1, wherein the transition layer has a spherical or near-spherical silicon phase, and a length of the spherical or near-spherical silicon phase is ≤10 μm, and a sphericity of the silicon phase is 20%-100%.

3. The composite brake disc according to claim 1, wherein the reinforced structure comprises a structure that allows the aluminum alloy base layer and the aluminum matrix composite layer to enter each other on the boundary surface where the aluminum alloy base layer and the aluminum matrix composite layer are bonded with each other.

4. The composite brake disc according to claim 1, wherein the transition layer comprises a near-aluminum matrix composite layer part on the side of the aluminum matrix composite layer and a near-aluminum alloy base layer part on the side of the aluminum alloy base layer, wherein the aluminum matrix composite layer and the near-aluminum matrix composite layer part both have reinforcement particles, where percentage of reinforcement particles decreases in gradient from the aluminum matrix composite layer to the near-aluminum matrix composite layer part; and/or the aluminum alloy base layer and the near-aluminum alloy base layer both have reinforcement particles, where percentage of reinforcement particles increases in gradient from the aluminum alloy base layer to the near-aluminum alloy base layer part, wherein the reinforcement particles are ceramic particles, where volume fraction of the ceramic particles is 15% to 30%, and size of the ceramic particles is 10~40 μm, and normal distribution of the ceramic particles is 10-30 μm.

5. The composite brake disc according to claim 1, wherein for the aluminum alloy base layer, tensile strength Rm is ≥200 MPa, elongation after fracture A is ≥2%, and hardness is ≥90 HBW and for the matrix composite layer, tensile strength Rm is ≥140 MPa, elongation after fracture A is ≥0.5% and hardness is ≥65 HBW wherein elongation after fracture of the transition layer A is ≥1%.

6. The composite brake disc according to claim 1, wherein micro-grain size of the transition layer is smaller than that of the aluminum alloy base layer and that of the aluminum matrix composite layer.

7. The composite brake disc according to claim 1, wherein the aluminum matrix composite layer is prepared by casting, powder metallurgy, or spray deposition process.

8. A preparation method for preparing an aluminum matrix composite brake disc, comprising:

a blank formation step: forming an aluminum alloy base layer using aluminum;

an aluminum matrix composite layer formation step: forming an aluminum matrix composite layer using aluminum matrix composites;

a laminating step: laminating the aluminum matrix composite layer and the aluminum alloy base layer to form a composite structure; and a friction stir processing step: friction stir processing from a composite structure surface of the aluminum alloy base layer and the aluminum matrix composite layer, so that the aluminum matrix composite layer and the aluminum alloy base layer are bonded with each other to form a transition layer.

9. The preparation method for preparing an aluminum matrix composite brake disc according to claim 8, wherein in the friction stir processing step, original dendrites in the aluminum alloy base layer and the aluminum matrix composite layer are broken to obtain fine grains of the aluminum alloy base layer and the aluminum matrix composite layer.

10. The preparation method for preparing an aluminum matrix composite brake disc according to claim 8, wherein in the aluminum matrix composite layer formation step, an aluminum matrix composite layer with a plurality of through-holes is prepared by direct drilling method; or, in the aluminum matrix composite layer formation step, a plurality of through-holes in array form are formed in the aluminum matrix composite layer, wherein the aluminum matrix composite layer formation step comprises:

aluminum matrix circular plate formation step: forming a circular aluminum matrix composite layer using aluminum matrix composites; and through-hole formation step: opening the through-holes on the circular aluminum matrix composite layer.

11. The preparation method for preparing an aluminum matrix composite brake disc according to claim 8, wherein after the laminating step, an additive adding step of adding reinforcement particles into the through holes is also included and after the additive adding step, an aluminum plate covering step of arranging an aluminum plate on the aluminum matrix composite layer for covering the reinforcement particles is also included.

12. The preparation method for preparing an aluminum matrix composite brake disc according to claim 8, wherein the friction stir processing step comprises a mixing step and a cooling step, where in the mixing step, the aluminum alloy base layer and the aluminum matrix composite layer are mixed together at contact portion, and in the cooling step, a brake disc with a transition layer formed from the mixed part is formed.

13. A preparation method for preparing an aluminum matrix composite brake disc, comprising:

an aluminum melting step: melting the aluminum completely to form molten aluminum;

a melt formation step: adding alloying materials into the molten aluminum to form a melt;

a mechanical stirring step: mechanically stirring the melt;

a reinforcement particle adding step: adding reinforcement particles into the melt and accelerating mechanical stirring;

a rolling step: rolling the melt into an aluminum matrix composite layer under vacuum condition; and a friction stir processing step: laminating the aluminum matrix composite layer and a pre-prepared aluminum alloy base layer, and friction stir processing from a composite structure surface of the aluminum alloy base layer and the aluminum matrix composite layer, and bonding the aluminum matrix composite layer and the aluminum alloy base layer together.

14. The preparation method for preparing an aluminum matrix composite brake disc according to claim 13, wherein before the reinforcement particle adding step, a reinforcement particle sieving step of sieving reinforcement particles is included, wherein in the reinforcement particle sieving step, reinforcement particles with particle size of 10-40 μm and normal distribution of 10-30 μm are screened out; wherein the reinforcement particles are SiC particles; wherein between the reinforcement particle adding step and the reinforcement particle sieving step, a reinforcement particle roasting pretreatment step of performing a roasting pretreatment on the reinforcement particles to remove surface impurities and moisture is included; wherein the reinforcement particle roasting pretreatment step comprises forming a SiO2 oxidation film on surface of the SiC particles that are served as the reinforcement particles; in the reinforcement particle roasting pretreatment step, the roasting pretreatment temperature is at 400-1000° C.; and wherein in the reinforcement particle adding step, the reinforcement particles are added at a speed of 2-5 g/s.

15. The preparation method for preparing an aluminum matrix composite brake disc according to claim 14, wherein before the melt formation step, a modifier and refiner weighing step of weighing the modifier and refiner based on a weight ratio of the aluminum is included, wherein between the melt formation step and the modifier and refiner weighing step, a step of adding the modifier and the refiner into the molten aluminum to form a melt is included; and wherein between the modifier and refiner weighing step and the step of adding the modifier and the refiner into the molten aluminum, a baking step of baking the modifier and the refiner to remove moisture is included.

16. The preparation method for preparing an aluminum matrix composite brake disc according to claim 13, wherein before the aluminum melting step, an aluminum preparation step of baking aluminum to remove moisture is included.

17. The preparation method for preparing an aluminum matrix composite brake disc according to claim 13, wherein the friction stir processing step comprises a mixing step and a cooling step, where in the mixing step, the aluminum alloy base layer and the aluminum matrix composite layer are fully mixed together at the contact portion, and in the cooling step, a brake disc with a transition layer is formed, wherein in the friction stir processing step, a stirring speed of the friction stir processing is 600-1200 rpm, and a feed speed is 100-500 mm/min.

18. The preparation method for preparing an aluminum matrix composite brake disc according to claim 13, wherein in the mechanical stirring step, a rotational speed of the motor is controlled at 500-600 rpm.

19. The preparation method for preparing an aluminum matrix composite brake disc according to claim 13, wherein in the friction stir processing step, a transition layer is formed between the aluminum matrix composite layer and the aluminum alloy base layer, wherein the transition layer has a spherical or spheroidal silicon phase and wherein a length of the silicon phase is ≤10 μm, and sphericity of the silicon phase is 20%-100%.

20. The preparation method for preparing an aluminum matrix composite brake disc according to claim 13, wherein for the aluminum matrix composite layer, the tensile strength Rm is ≥140 MPa, the elongation after fracture A is ≥0.5%, and the hardness is ≥65 HBW.

* * * * *